United States Patent Office 3,071,589
Patented Jan. 1, 1963

3,071,589
3-BENZYL-4-LOWER-ALKYL-3,4,5,6,-TETRAHYDRO-4-CARBOLINE QUATERNARY AMMONIUM SALTS AND PREPARATION THEREOF
Sydney Archer, Bethlehem, N.Y., assignor to Sterling Drug Inc., New York, N.Y., a corporation of Delaware
No Drawing. Filed June 10, 1959, Ser. No. 819,217
6 Claims. (Cl. 260—296)

This invention relates to new 3-benzyl-4-lower-alkyl-3,4,5,6-tetrahydro-4-carboline quaternary ammonium salts and to methods for the preparation thereof.

The compounds of the invention are quaternary ammonium salts of compounds having the formula

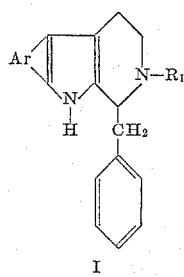

I wherein Ar is monocarbocyclic ortho-arylene and $R_1$ is lower-alkyl.

A preferred aspect of the invention relates to compounds having the formula

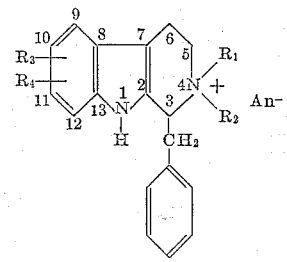

wherein $R_1$ represents lower alkyl; $R_2$ represents lower-alkyl, hydroxy-lower-alkyl, lower-alkenyl or monocarbocyclic aryl lower-alkyl; $An^-$ represents an anion from an ester, $R_2An$, of a strong acid; and $R_3$ and $R_4$ each represents hydrogen or from one to two substituents selected from the group consisting of halogen (including fluorine, chlorine, bromine and iodine), lower-alkyl, lower-alkoxy, hydroxy, methylene-dioxy, lower-alkylmercapto, lower-alkylsulfinyl, lower-alkylsulfonyl and lower-alkanoyloxy.

In the above general Formula II, $R_1$ represents lower-alkyl which can be either straight or branched and can contain from one to about four carbon atoms. $R_1$ thus stands, inter alia, for methyl, ethyl, propyl, isopropyl, n-butyl, and the like.

In the above general Formula II, $R_2$ represents lower-alkyl, hydroxy-lower-alkyl, lower-alkenyl or monocarbocyclic aryl-lower-alkyl; and $An^-$ represents the anion of an ester of a strong acid, for example an inorganic acid or an organic sulfonic acid. Thus $R_2An$ together represent lower-alkyl, hydroxy-lower-alkyl, lower-alkenyl or monocarbocyclic aryl-lower-alkyl esters of said inorganic acids or organic sulfonic acids. Said esters preferably have a molecular weight less than about 250. Thus $R_2An$ together represent such compounds, inter alia, as methyl chloride, methyl bromide, methyl iodide, ethyl bromide, propyl chloride, isopropyl chloride, n-butyl iodide, 2-hydroxyethyl bromide, allyl chloride, allyl bromide, methyl sulfate, methyl benzenesulfonate, methyl p-toluenesulfonate, benzyl chloride, benzyl bromide, p-chloro-benzyl chloride, p-nitrobenzyl chloride, o-chlorobenzyl chloride, p-methoxybenzyl chloride, and the like.

In the above general Formula II, $R_3$ and $R_4$ each represents hydrogen or a substituent selected from the group consisting of halogen (including fluorine, chlorine, bromine and iodine), lower-alkyl, lower-alkoxy, hydroxy, methylenedioxy, lower-alkyl-mercapto, lower-alkylsulfinyl, lower-alkylsulfonyl and lower-alkanoyloxy. When $R_3$ and $R_4$ represent one of the above substituents, said substituents can be on any of the four available positions of the benzene ring, and when more than one substituent is present, they can be the same or different. When $R_3$ or $R_4$ represents lower-alkyl, lower-alkoxy, lower-alkylmercapto, lower-alkylsulfinyl, lower-alkylsulfonyl, or lower-alkanoyloxy, they can be straight or branched and can contain from one to about four carbon atoms. $R_3$ and $R_4$ thus stand, inter alia, for fluorine, chlorine, bromine, iodine, methyl, ethyl, butyl, methoxy, dimethoxy, ethoxy, ethoxy-methoxy, hydroxy, methylenedioxy, methylmercapto, methylsulfinyl, methylsulfonyl, isopropylmercapto, isopropylsulfinyl, isopropylsulfonyl, acetoxy, and the like.

The compounds of the invention are prepared by the following reactions in which $R_1$, $R_2$, $R_3$, $R_4$ and $An^-$ have the meanings given above.

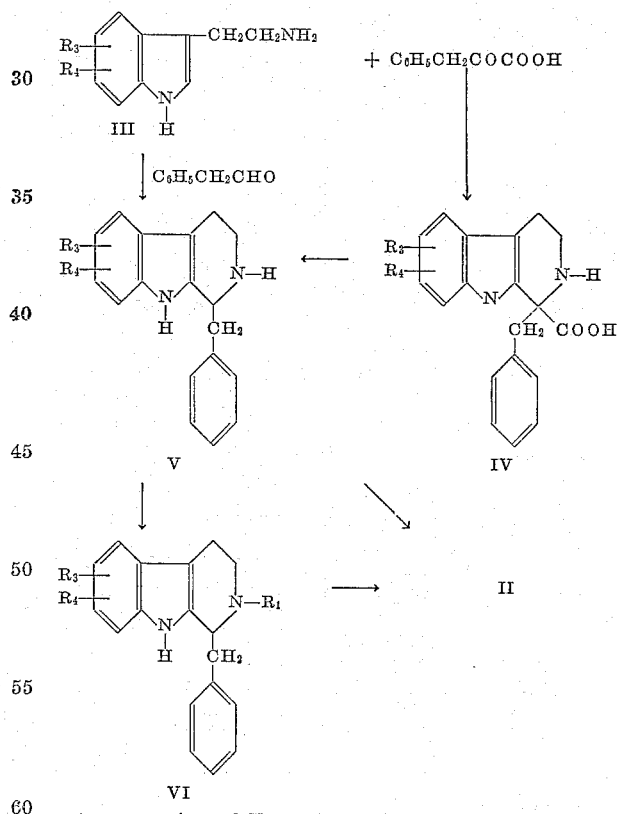

A tryptamine of Formula III is reacted with phenyl-pyruvic acid at a temperature between about 50° C. and about 150° C. in a solvent inert under the conditions of the reaction, for example water, methanol, ethanol and ethylene glycol to give the compounds of Formula IV. A preferred solvent is water.

The resulting 3-benzyl-3,4,5,6-tetrahydro-4-carboline-3-carboxylic acids of Formula IV thus produced are then decarboxylated to the corresponding 3-benzyl-3,4,5,6-tetrahydro-4-carbolines of Formula V by heating the former at a temperature in the range from about 50° C. to about 100° C. with a strong mineral acid, for example hydrochloric acid, hydrobromic acid, sulfuric acid, phosphoric acid and the like. The reaction is preferably carried out in an organic solvent inert under the conditions of the reaction, for example methanol, ethanol, isopropanol, ethylene glycol, and the like. A preferred mineral acid is hydrochloric acid, and a preferred solvent is methanol.

Alternatively the compounds of Formula V can be prepared by reacting a tryptamine with phenylacetaldehyde at a temperature in the range from about 50° C. to about 150° C. in the presence of a strong mineral acid, for example hydrochloric acid, sulfuric acid, phosphoric acid and the like, thus giving the compounds of Formula V directly. The reaction is preferably conducted in a solvent inert under the conditions of the reaction, for example water, methanol, ethanol and the like. A preferred mineral acid is sulfuric acid and a preferred solvent is water.

Compounds of Formula II, where $R_1$ and $R_2$ are the same lower-alkyl, can be prepared by reacting the 3-benzyl-3,4,5,6-tetrahydro-4-carbolines of Formula V in the presence of an acid-acceptor with at least two molar equivalents of a lower-alkylating agent, for example lower-alkyl esters of strong acids. Preferred lower-alkylating agents are lower-alkyl sulfates, lower-alkyl halides and lower-alkyl p-toluenesulfonates. The reaction is preferably carried out at a temperature in the range from about 50° C. to about 100° C. in the presence of an acid-acceptor and in an organic solvent inert under the conditions of the reaction, for example methanol, ethanol, isopropanol, ethylene glycol and the like.

The purpose of the acid-acceptor is to take up the hydrogen halide produced when a lower-alkyl halide is the lower-alkylating agent, or the lower-alkyl acid sulfate or sulfuric acid produced when a lower-alkyl sulfate is the lower-alkylating agent, or the p-toluenesulfonic acid produced when a lower-alkyl p-toluenesulfonate is the lower-alkylating agent. The acid-acceptor includes such substances as alkali metal carbonates, for example sodium and potassium carbonate and alkali metal hydroxides, for example sodium hydroxide and potassium hydroxide. A preferred lower-alkylating agent is a lower-alkyl halide, and it is preferred to carry out the reaction in methanol using sodium carbonate as the acid-acceptor.

Alternatively, the 3-benzyl-3,4,5,6-tetrahydro-4-carbolines of Formula V, prepared by either of the methods described above, can be reacted with one molar equivalent amount of a lower-alkylating agent, for example a lower-alkyl sulfate, a lower-alkyl halide or a lower-alkyl p-toluenesulfonate, in the presence of a molar equivalent amount of an acid-acceptor at a temperature in the range from about 50° C. to about 100° C. to give the corresponding 3-benzyl-4-lower-alkyl-3,4,5,6-tetrahydro-4-carbolines of Formula VI. The reaction is preferably carried out in an organic solvent inert under the conditions of the reaction, for example methanol, ethanol, isopropanol, ethylene glycol, and the like. The purpose and nature of the acid-acceptor are the same as described above for the direct preparation of the compounds of Formula II from the compounds of Formula V.

The compounds of Formula II can then be prepared from the resulting 3-benzyl-4-lower-alkyl-3,4,5,6-tetrahydro-4-carbolines by mixing the latter with the lower-alkyl, hydroxy-lower-alkyl, lower-alkenyl or monocarbocyclic aryl-lower-alkyl ester in an organic solvent for example methanol, ethanol, acetonitrile, acetone and the like. Heating can be used to facilitate the reaction although salt formation generally takes place readily at room temperature. The compounds of Formula II separate directly or can be obtained by concentration of the solution. This procedure affords compounds of Formula II wherein both $R_1$ and $R_2$ are either the same or different lower-alkyls or where $R_1$ represents lower-alkyl and $R_2$ represents either lower-alkenyl, hydroxy-lower-alkyl or monocarbocyclic aryl-lower-alkyl.

The tryptamines used as starting material in the above-described procedures are prepared by known methods, for example by the Fischer indole synthesis using an appropriate phenylhydrazine and a γ-phthalimidobutyraldehyde. The resulting 3-(2-phthalimidoethyl)indoles, on hydrolysis with hydrazine hydrate, afford the desired tryptamines.

Alternatively, the starting tryptamines can be prepared by reacting an indole with formaldehyde and a di-lower-alkyl amine, for example dimethylamine, to give a 3-di-lower-alkylaminomethylindole. The latter, on reaction with hydrocyanic acid, gives the corresponding 3-cyanomethylindole which on catalytic reduction with, for example, palladium-on-charcoal affords the desired tryptamine.

Another method for preparing the starting tryptamines comprises reacting an indole with a glyoxalyl halide to give a 3-(indolyl)glyoxalyl halide. The tryptamines are obtained by reacting the 3-(indolyl)glyoxalyl chloride with ammonia and reducing the resulting 3-(indolyl)glyoxamide with an alkali metal aluminum hydride, for example lithium aluminum hydride.

The quaternary ammonium salts of the invention possess a depressant action on the central nervous system, they lower the blood pressure, and they possess monoamineoxidase inhibition activity. These properties indicate their usefulness as hypotensive agents and as psychic energizers.

Preferred quaternary ammonium salts are water-soluble and are the form in which the compounds are conveniently prepared for pharmacological use. Pharmacologically acceptable salts are salts whose anions are innocuous to the animal organism in effective doses of the salts, so that beneficial physiological properties inherent in the free bases are not vitiated by side-effects ascribable to the anions; in other words, the latter do not substantially affect the pharmacological properties inherent in the cations.

Although pharmacologically acceptable salts are preferred, those having toxic anions are also useful in preparing pharmacologically acceptable salts by ion exchange procedures.

The structures of the compounds of the invention have been established by chemical analysis and by the processes for their preparation, which can only lead to compounds of the assigned structures.

The following examples will further illustrate the invention, without the latter being limited thereto.

EXAMPLE 1a

*3-Benzyl-3,4,5,6-Tetrahydro-4-Carboline-3-Carboxylic Acid*

[IV; $R_3$ and $R_4$ are H]

Tryptamine hydrochloride (5.85 g., 0.036 mole) and phenylpyruvic acid (6.0 g., 0.037 mole) were separately dissolved in 75 ml. of water with warming. The solutions were cooled, combined and the combined solution heated on a steam bath for about thirty hours. When cooled, the product separated and was collected by filtration giving 8.6 g. of 3-benzyl-3,4,5,6-tetrahydro-4-carboline-3-carboxylic acid, M.P. 226–232° C. (uncorr.).

EXAMPLE 1b

*3-Benzyl-4-Methyl-3,4,5,6-Tetrahydro-4-Carboline Methiodide*

[II; $R_1$ and $R_2$ are $CH_3$, $R_3$ and $R_4$ are H; $An^-$ is $I^-$]

3-benzyl-3,4,5,6-tetrahydro-4-carboline - 3 - carboxylic acid (8.6 g., 0.031 mole) was dissolved in 400 ml. of methanol in a 3-necked round-bottom flask provided with a gas inlet tube and a reflex condenser. The solution was heated under reflux for two hours while continuously bubbling in gaseous hydrogen chloride. The solution was concentrated to a small volume, cooled, and the solid which separated was collected and dried giving 5.5 g. of 3-benzyl-3,4,5,6-tetrahydro-4-carboline hydrochloride, M.P. 271–272° C. (uncorr.).

*Anal.*—Calcd. for $C_{17}H_{18}N_2 \cdot HCl$: N, 9.77. Found: N, 9.06.

The 3-benzyl-3,4,5,6-tetrahydro-4-carboline hydrochloride obtained above was converted to the free base, and 2.8 g. (0.011 mole) of the base was dissolved in 25 ml. of methanol. To the solution was added 3.0 g. (0.028 mole) of sodium carbonate and 5 ml. of methyl iodide. The mixture was heated under reflux for twenty-one hours, cooled and the precipitated solid collected. The solid was recrystallized from water giving 3.3 g. of 3-benzyl-4-methyl-3,4,5,6-tetrahydro-4-carboline methiodide, M.P. 206.4–207.3° C. (corr.).

*Anal.*—Calcd. for $C_{20}H_{23}N_2I$: C, 57.42; H, 5.54; N, 6.70. Found: C, 57.67; H, 6.49; N, 5.34.

EXAMPLE 2a

*3-Benzyl-11-Methoxy-3,4,5,6-Tetrahydro-4-Carboline*

[V; $R_3$ is 11–$CH_3O$, $R_4$ is H]

By reacting 6-methoxytryptamine with a molar equivalent amount of phenylacetaldehyde in an aqueous medium in the presence of sulfuric acid, there can be obtained 3-benzyl-11-methoxy-3,4,5,6-tetrahydro-4-carboline.

EXAMPLE 2b

*3-Benzyl-11-Methoxy-4-Methyl-3,4,5,6-Tetrahydro-4-Carboline Allobromide*

[II; $R_1$ is $CH_3$; $R_2$ is $CH_2=CHCH_2$, $R_3$ is 11—$CH_3O$, $R_4$ is H, $An^-$ is $Br^-$]

By reacting the 3-benyl-11-methoxy-3,4,5,6-tetrahydro-4-carboline obtained above in Example 2a with one molar equivalent amount of methyl sulfate in the presence of sodium carbonate in an appropriate solvent, for example ethanol, there can be obtained 3-benzyl-11-methoxy-4-methyl-3,4,5,6-tetrahydro-4-carboline. By reacting the latter with allyl bromide in an appropriate organic solvent, for example ethanol, there can be obtained 3-benzyl-11-methoxy4-methyl-3,4,5,6-tetrahydro-4-carboline allobromide.

EXAMPLES 3–22

By following one of the manipulative procedures described above in Examples 1 and 2, substituting for the reactants used therein the appropriate tryptamine, the appropriate lower-alkylating agent and the appropriate lower-alkyl, hydroxy-lower-alkyl, lower-alkenyl or monocarbocyclic aryl-lower-alkyl ester of a strong acid, there can be obtained the compounds of Formula II listed below in Table I.

The compounds can be prepared for use by dissolving the salts under sterile conditions in water or in a physiologically compatible aqueous medium such as saline, and stored in ampules for intramuscular injection. Alternatively they can be formulated in unit dosage form as tablets for oral administration in combination with suitable adjuvants such as calcium carbonate, starch, lactose, talc, magnesium stearate, gum acacia, and the like. Alternatively they can be employed in capsule form either alone or admixed with an adjuvant. Still further, the compounds can be formulated for oral administration as aqueous alcohol solutions, oil solutions or oil-water emulsions in the same manner as conventional medicinal substances are prepared.

I claim:

1. A compound having the formula

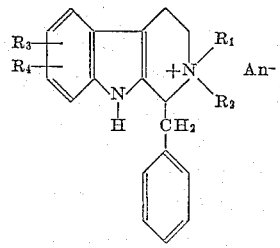

wherein $R_1$ is lower-alkyl; $R_2$ is a member of the group consisting of lower-alkyl, hydroxy-lower-alkyl, lower-alkenyl and monocarbocyclic aryl lower-alkyl; $R_3$ and $R_4$ each is a member of the group consisting of hydrogen, halogen, lower-alkyl, lower-alkoxy, hydroxy, methylenedioxy, lower-alkylmercapto, lower-alkylsulfinyl, lower-alkylsulfonyl and lower-alkanoyloxy; and $An^-$ is an anion.

2. A compound having the formula

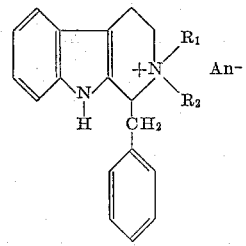

wherein $R_1$ and $R_2$ are lower-alkyl, and $An^-$ is an anion.

3. 3 - benzyl - 4 - methyl-3,4,5,6-tetrahydro-4-carboline methiodide.

TABLE I

| Example | $R_1$ | $R_2$ | An | $R_3, R_4$ |
|---|---|---|---|---|
| 3 | $CH_3$ | $CH_3$ | $Cl^-$ | 10-F |
| 4 | $C_2H_5$ | $CH_3$ | $Br^-$ | 10-Cl |
| 5 | $n\text{-}C_3H_7$ | $CH_3$ | $I^-$ | 10-Br |
| 6 | iso-$C_3H_7$ | $C_2H_5$ | $I^-$ | 10-I |
| 7 | $n\text{-}C_4H_9$ | $n\text{-}C_3H_7$ | $Cl^-$ | 12-$CH_3$ |
| 8 | $CH_3$ | iso-$C_3H_7$ | $Cl^-$ | 12-$C_2H_5$ |
| 9 | $CH_3$ | $n\text{-}C_4H_9$ | $I^-$ | 12-$n\text{-}C_4H_9$ |
| 10 | $CH_3$ | $HOCH_2CH_2$ | $Br^-$ | 9-$CH_3O$ |
| 11 | $CH_3$ | $CH_2=CHCH_2$ | $Cl^-$ | 10,11-di-$CH_3O$ |
| 12 | $CH_3$ | $CH_2=CHCH_2$ | $Br^-$ | 9-$C_2H_5O$ |
| 13 | $CH_3$ | $CH_3$ | $CH_3SO_4^-$ | 10-$C_2H_5O$-11-$CH_3O$ |
| 14 | $CH_3$ | $CH_3$ | $C_6H_5SO_3^-$ | 11-HO |
| 15 | $CH_3$ | $CH_3$ | p-$CH_3C_6H_4SO_3^-$ | 10,11-$OCH_2O$ |
| 16 | $CH_3$ | $C_6H_5CH_2$ | $Cl^-$ | 11-$CH_3S$ |
| 17 | $CH_3$ | $C_6H_5CH_2$ | $Br^-$ | 11-$CH_3SO$ |
| 18 | $CH_3$ | p-$ClC_6H_4CH_2$ | $Cl^-$ | 11-$CH_3SO_2$ |
| 19 | $CH_3$ | p-$NO_2C_6H_4CH_2$ | $Cl^-$ | 11-$(CH_3)_2CHS$ |
| 20 | $CH_3$ | o-$ClC_6H_4CH_2$ | $Cl^-$ | 11-$(CH_3)_2CHSO$ |
| 21 | $CH_3$ | p-$CH_3OC_6H_4CH_2$ | $Cl^-$ | 11-$(CH_3)_2CHSO_2$ |
| 22 | $CH_3$ | 3,4-$Cl_2C_6H_3CH_2$ | $Cl^-$ | 11-$CH_3COO$ |

4. The process for preparing a compound having the formula

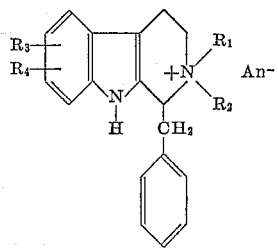

wherein $R_1$ is lower-alkyl; $R_2$ is a member of the group consisting of lower-alkyl, hydroxy-lower-alkyl, lower-alkenyl and monocarbocyclic aryl lower-alkyl; $R_3$ and $R_4$ each is a member of the group consisting of hydrogen, halogen, lower-alkyl, lower-alkoxy, hydroxy, methylenedioxy, lower-alkylmercapto, lower-alkylsulfinyl, lower-alkylsulfonyl and lower-alkanoyloxy; and An⁻ is an anion which comprises reacting a compound having the formula

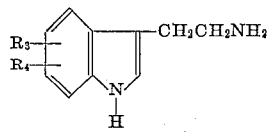

with phenylpyruvic acid, decarboxylating the resulting 3-benzyl-3,4,5,6-tetrahydro-4-carboline-3-carboxylic acid by heating it with a strong mineral acid; reacting the resulting 3-benzyl-3,4,5,6-tetrahydro-4-carboline with one molar equivalent amount of a lower-alkylating agent in the presence of an acid-acceptor, and reacting the resulting 3 - benzyl - 4 - lower - alkyl-3,4,5,6-tetrahydro-4-carboline with an ester, $R_2An$, of a strong acid wherein $R_2$ and $R_3$ have the meanings given above.

5. The process for preparing a compound having the formula

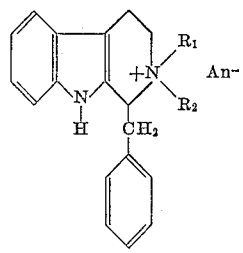

wherein $R_1$ and $R_2$ are lower-alkyl, and An⁻ is an anion which comprises reacting tryptamine with phenylpyruvic acid, decarboxylating the resulting 3-benzyl-3,4,5,6-tetrahydro-4-carboline-3-carboxylic acid by heating it with a strong mineral acid, and reacting the resulting 3-benzyl-3,4,5,6-tetrahydro-4-carboline in the presence of an acid-acceptor with at least two molar equivalents of a lower-alkyl ester of an inorganic acid.

6. The process for preparing 3-benzyl-4-methyl-3,4,5,6-tetrahydro-4-carboline methiodide which comprises reacting tryptamine with phenylpyruvic acid, decarboxylating the resulting 3-benzyl-3,4,5,6-tetrahydro-4-carboline-3-carboxylic acid by heating it with hydrochloric acid, and reacting the resulting 3-benzyl-3,4,5,6-tetrahydro-4-carboline in the presence of an acid-acceptor with at least two molar equivalents of methyl iodide.

References Cited in the file of this patent
UNITED STATES PATENTS

| | | |
|---|---|---|
| 2,642,438 | Duschinsky | June 16, 1953 |
| 2,819,998 | McLamore | Jan. 14, 1958 |
| 2,852,520 | Robinson | Sept. 16, 1958 |

OTHER REFERENCES

Hahn et al.: Berichte der Deut. Chem. Gesell., vol. 67B, pp. 2031–2035 (1934).

Hoshino: Chemical Abstracts, vol. 29, pp. 2956 (1935).

UNITED STATES PATENT OFFICE
CERTIFICATE OF CORRECTION

Patent No. 3,071,589                                              January 1, 1963

Sydney Archer

It is hereby certified that error appears in the above numbered patent requiring correction and that the said Letters Patent should read as corrected below.

Column 1, lines 32 to 42, below the formula insert -- II --; column 2, lines 35 to 45, formula IV should appear as shown below instead of as in the patent:

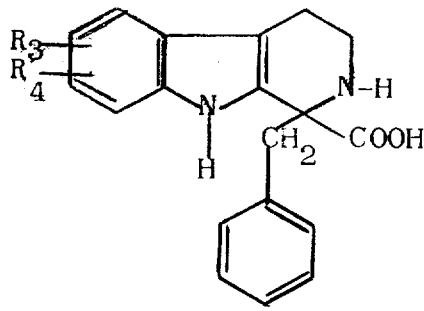

column 5, line 42, for "-methoxy4-methyl-" read -- methoxy-4-methyl- --; column 6, lines 34 to 36, for "methylenedioxy, lower-alkylmercapto, lower-alkylsulfinyl, lower-alkylsulfonyl and lower-alkanoyloxy;" read -- lower-alkylmercapto, lower-alkylsulfinyl, lower-alkylsulfonyl and lower-alkanoyloxy, and $R_3$ and $R_4$ together are methylenedioxy; --; column 7, lines 19 to 21, for "methylenedioxy, lower-alkylmercapto, lower-alkylsulfinyl, lower-alkylsulfonyl and lower-alkanoyloxy;" read -- lower-alkylmercapto, lower-alkylsulfinyl, lower-alkylsulfonyl and lower-alkanoyloxy, and $R_3$ and $R_4$ together are methylenedioxy; --.

Signed and sealed this 24th day of December 1963.

(SEAL)
Attest:
ERNEST W. SWIDER

Attesting Officer

EDWIN L. REYNOLDS
Acting Commissioner of Patents